United States Patent
Klein

[11] Patent Number: 6,061,236
[45] Date of Patent: *May 9, 2000

[54] COMPUTER COMPONENT CARRIER THAT DIRECTS AIRFLOW TO CRITICAL COMPONENTS

[75] Inventor: Dean A. Klein, Lake City, Minn.

[73] Assignee: Micron Electronics, Inc., Nampa, Id.

[*] Notice: This patent is subject to a terminal disclaimer.

[21] Appl. No.: 08/848,528

[22] Filed: Apr. 28, 1997

Related U.S. Application Data

[63] Continuation of application No. 08/524,336, Sep. 6, 1995, Pat. No. 5,644,472.

[51] Int. Cl.[7] .................................................... H05H 7/20
[52] U.S. Cl. .................. 361/695; 361/679; 361/732; 361/757; 361/759; 361/818
[58] Field of Search ............................. 361/600, 679–688, 361/690, 694–695, 730, 732, 740–742, 759, 807, 809–811, 916, 818

[56] References Cited

U.S. PATENT DOCUMENTS

| | | | |
|---|---|---|---|
| 1,628,889 | 5/1927 | Krantz | 361/641 |
| 2,063,099 | 12/1936 | Loock | 361/642 |
| 5,473,507 | 12/1995 | Schwegler et al. | 361/690 |

*Primary Examiner*—Gregory Thompson
*Attorney, Agent, or Firm*—Trop, Pruner & Hu, P.C.

[57] ABSTRACT

A computer component carrier isolates components from vibration, reduces noise, reduces assembly time, improves airflow to critical components, and reduces EMI. The component carrier is fabricated from a vibration damping material such as urethane foam. The component carrier contains cavities to accommodate electronic components. These cavities are interconnected via airways that direct airflow between the cavities. The component carrier includes two or more pieces. Components are placed in the cavities of the component carrier designed to accommodate the components and the pieces of the component carrier are mated and secured. In this manner, the components are firmly held in position by the component carrier. The component carrier can be fabricated with a hard exterior finish that replaces a computer casing or cabinet. The component carrier can also be fabricated from a recyclable and/or recycled material.

8 Claims, 2 Drawing Sheets

COMPUTER COMPONENT CARRIER THAT DIRECTS AIRFLOW TO CRITICAL COMPONENTS

This is a continuation of application Ser. No. 08/524,336 filed Sep. 6, 1995 now U.S. Pat. No. 5,644,472.

FIELD OF THE INVENTION

This invention relates in general to the manufacture of desktop computers. More particularly, this invention relates to a novel component carrier for use in desk-top computers to reduce noise and vibration, and to improve airflow, electromagnetic interference (EMI) shielding and shock protection.

BACKGROUND OF THE INVENTION

Conventional desktop computer assembly is performed by attaching components, e.g., a motherboard, hard disk drive, and power supply, to a primarily metal chassis by screws, clips, or other conventional fasteners. This metal chassis is inserted into a metal and/or plastic casing or cabinet. Heat generating components are cooled via a fan that circulates air throughout the casing. The metal chassis and casing do little to reduce vibration, suppress noise, or absorb shock.

SUMMARY OF THE INVENTION

The present invention is a component carrier for desktop computers that reduces noise and vibration, improves airflow to heat generating components, improves EMI shielding, improves shock protection, and reduces assembly time. The component carrier includes at least a top carrier and bottom carrier. Each piece of the carrier is molded, or otherwise fabricated, from a vibration damping material to include a plurality of cavities designed to accommodate components of the computer. These cavities are interconnected via airways to direct airflow between components. The components are inserted into the top or bottom carrier and the carriers are mated and secured to each other. In this manner, the components are firmly held in position by the component carrier.

A component carrier in accordance with the present invention has the advantages of: 1) isolating the components from vibration, 2) providing protection from shock, 3) reducing noise generated by moving parts such as fans and hard disk drive motors, 4) reducing the time required to assemble the components into a complete computer system, 5) improving airflow around components by directing airflow to those components, 6) reducing electromagnetic emissions from the computer system, and 7) permitting the use of lower-power fans to achieve equivalent cooling, thus reducing energy consumption and noise.

DETAILED DESCRIPTION OF SPECIFIC EMBODIMENTS

One illustrative embodiment of the invention is described below as it might be implemented. In the interest of clarity, not all features of an actual implementation are described in this specification. It will of course be appreciated that in the development of any such actual implementation numerous implementation-specific decisions must be made to achieve the developer's specific goals, such as compliance with system- and business-related constraints, which will vary from one implementation to another. Moreover, it will be appreciated that such a development effort might be complex and time-consuming, but would nevertheless be a routine undertaking for those of ordinary skill having the benefit of this disclosure.

Figure 1:
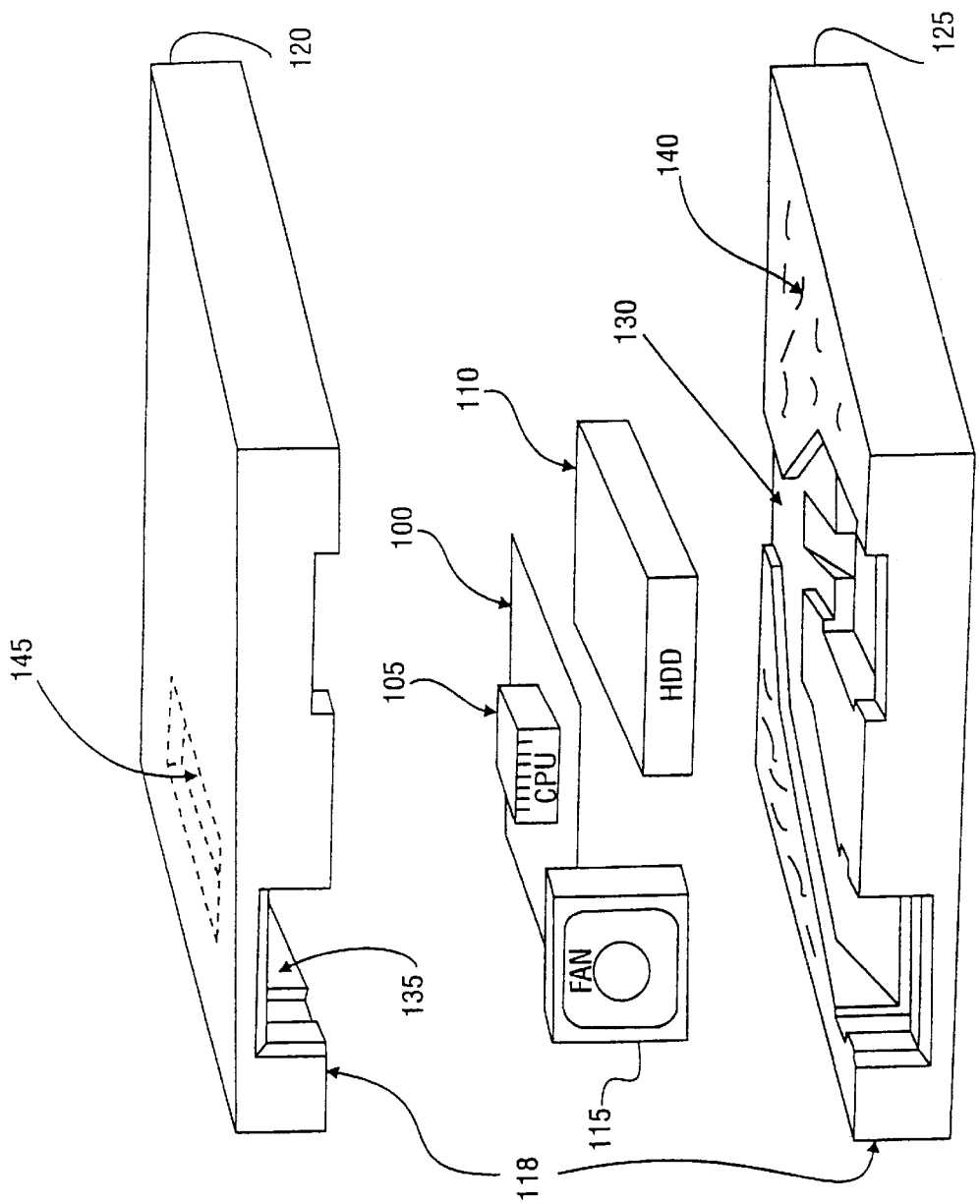
FIG. 1 is an exploded perspective view of a computer system assembly in accordance with the invention.

FIG. 1 shows a electronic-component carrier assembly 118 (also referred to in this specification as component carrier 118 and carrier 118) for assembling a desktop computer. The component carrier 118 comprises a top carrier 120 and a bottom carrier 125. For illustration purposes, FIG. 1 also shows a few typical components assembled in the component carrier 118: a motherboard subassembly 100, a central processing unit (CPU) 105, a hard disk drive 110 and a fan assembly 115.

The motherboard subassembly 100 is a conventional motherboard subassembly with electronic components mounted to it. The motherboard may include a CPU 105 and is likely to include other potentially heat sensitive components such as read-write random-access memory (RAM). The CPU 105 is a conventional central processing unit mounted on motherboard subassembly 100. The hard disk drive 110 is a conventional hard disk drive for storing data. The fan assembly 115 includes a conventional fan for circulating air in the component carrier 118. Frequently the fan assembly 115 will be a power supply (not shown) that includes a fan. These components are shown for illustration purposes only. It will be recognized by one of ordinary skill that other components may be assembled in addition to or in place of the above components.

The bottom carrier 125 comprises a plenum 130 and, optionally, conducting fibers 140. The plenum 130 comprises a plurality of cavities and airways connecting those cavities. The cavities are designed to accommodate components such as the motherboard 100, the hard disk drive 110, and the fan assembly 115. The cavity that accommodates the motherboard 100 is referred to as a motherboard cavity, the cavity that accommodates the fan assembly 115 is referred to as a fan cavity, the cavity that accommodates the hard disk drive 110 is referred to as a HDD cavity, and the above cavities are collectively referred to as component cavities.

The cavities of the plenum 130 are interconnected as necessary to permit desired airflow between the components accommodated in the cavities. For example, airflow from the fan assembly 115 may be used to cool the CPU 105, or, in a cold environment, heat from the CPU 105 may be used to warm other components. By directing airflow directly to the components, the efficiency of the cooling and/or heating is improved. Therefore, for example, a lower-power fan can be used to obtain equivalent cooling, which has the advantage of reducing the energy consumption and noise of the computer.

The conducting fibers 140 may be impregnated into the material of the bottom carrier 125 to provide EMI shielding and/or static protection. Because the carrier 118 with the conducting fibers 140 envelops the components, the EMI shielding of the carrier 118 is improved over conventional systems that depend on the computer casing to provide shielding.

The bottom carrier 125 is fabricated from a suitable vibration damping and shock absorbing material such as conventional urethane foams or other materials well known to those of ordinary skill. Additionally, the bottom carrier 125 may comprise an exterior finish to provide a hard exterior to the component carrier. In this manner, the component carrier may serve the additional function of a casing or cabinet. If an exterior finish is used, the interior of the carrier is referred to as the body of the carrier.

The top carrier 120 comprises a plenum 135 that serves the same function as the plenum 130 described above. Although it is not shown in FIG. 1, the top carrier 120 may also be impregnated with conducting fibers, similar to the conducting fibers 140 of bottom carrier 125, to provide EMI shielding and/or static protection. The top carrier 120 may also comprise an exterior finish.

A knock-out 145 in shown in association with the top carrier 120. The knock-out 145 is a removable section of the carrier 118, which may be removed to create a cavity to accommodate additional components such as expansion cards, additional disk drives, CD-ROM drives and tape backup units. When the knock-out 145 is removed, a cavity is created in the top carrier 120. This cavity allows an additional component to be inserted into the carrier 118. It would be apparent to one of ordinary skill that the knock-out 145 can also be used in association with the bottom carrier 125.

The desktop computer may be assembled using the component carrier 118 in accordance with the present invention by: fabricating the carrier 118; conventionally inserting components into one piece of the carrier 118; applying the second piece of the carrier (and if applicable, the third, fourth, etc. pieces); and securing the multiple pieces of the carrier to each other with screws, clips, or other conventional means. These tasks are discussed in more detail below.

5.0(a) Fabricating the Component Carrier

One method of fabricating the carrier 118 using conventional molding techniques is described below. Those of ordinary skill having the benefit of this disclosure will recognize that other fabrication techniques may be used if desired, e.g., machining, progressive build-up, etc.

The carrier 118 is designed in accordance with conventional techniques to achieve the desired component layout, airflow, and shock absorption. Optionally, an exterior finish may also be designed. Computer system designers commonly use computer-assisted design (CAD) software to accomplish this task.

After the carrier is designed, a suitable material for the exterior finish or the body of the carrier 118 or both is selected. Suitable materials for the exterior finish are well known in the computer industry and are not described further herein. Suitable materials for the body of the carrier 118 include, e.g., conventional urethane foams and similar materials well known to those of ordinary skill. The material may be selected to be easily recyclable when the computer reaches the end of its useful life. Moreover, in some applications the material may be a recycled material, e.g., recycled plastic such as is obtained from milk bottles and the like.

One or more molds suitable for the material(s) selected and in accordance with the design of the carrier 118 are created. If the carrier is designed to be the finished product, i.e. both the component carrier and the casing, then an additional mold may be required to achieve the desired exterior finish.

Each piece of carrier 118 (e.g., the top carrier 120 and the bottom carrier 125) is conventionally molded. The molding process may of course require one or more steps depending on, e.g., the material(s) selected, the exterior finish desired, etc. If desired, the materials may be injected or otherwise impregnated with conductive fibers such as graphite, shown as 140, so that the carrier 118 will provide at least some EMI shielding, static protection, or both.

5.0(b) Inserting Components Into the Component Carrier

The appropriate components are physically inserted into the associated cavities in the bottom carrier 125. (Of course, if the computer system is being partly or completely assembled upside down, some or all of the components may be inserted into the associated cavities in the top carrier 120.)

The components may simply rest inside the associated cavities, or optionally some or all of the components may be physically attached to the carrier by screws, clips, or other conventional means.

Finally, any necessary electrical attachments between the components are made, e.g., with cables, wires, or other conventional means.

5.0(c) Applying the Second Piece of the Component Carrier

Figure 2:
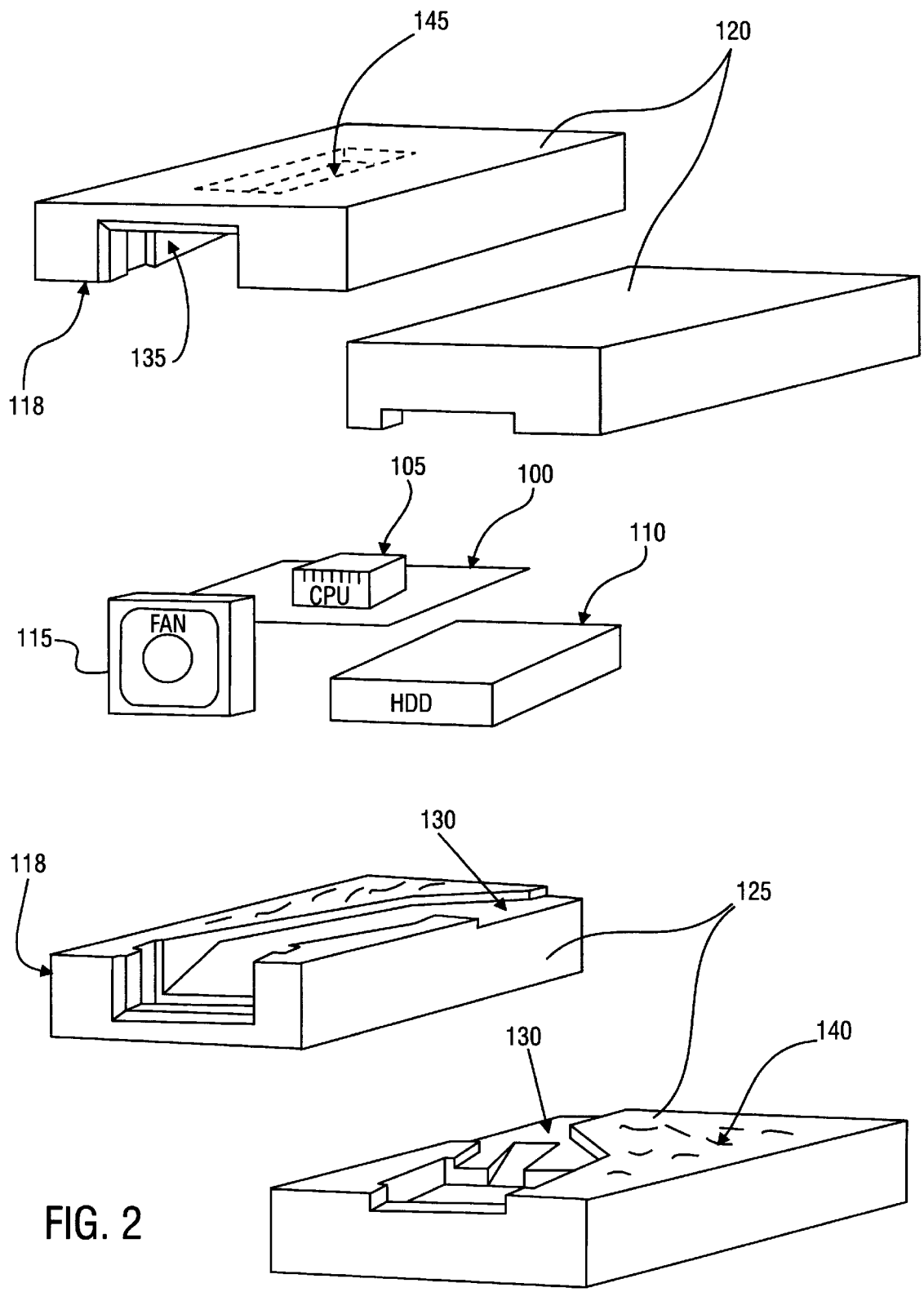
FIG. 2 is an exploded perspective view of the computer system assembly in an alternative embodiment.

Assume as an example that all components are inserted into the bottom carrier 125. The top carrier 120 is then fitted onto the bottom carrier 125 so that the cavities in the top carrier 120 align correctly with the associated components. The components are held firmly in the cavities of the carrier 118. By firmly holding the components, the components are protected from shock, vibration is reduced, and noise is suppressed. Optionally, the top carrier 120 may comprise multiple pieces (as may the bottom carrier 125); if so, each piece is likewise fitted onto the bottom carrier 125 in any convenient manner FIG. 2 shows one example of top carrier 120 and bottom carrier 125 exhibiting multiple pieces.

5.0(d) Securing the Pieces of the Carrier

After all the pieces of the component carrier 118 are fitted together, the pieces are secured. The pieces of the carrier 118 can be secured using conventional means, such as screws, clips, etc.

It will be appreciated by those of ordinary skill having the benefit of this disclosure that numerous variations from the foregoing illustration will be possible without departing from the inventive concept described herein. Accordingly, it is the claims set forth below, and not merely the foregoing illustration, which are intended to define the exclusive rights claimed in this application.

While the present invention was conceived in connection with desktop computers, it will be recognized in hindsight by those of ordinary skill that the electronic system assembled using the present invention may be of any desired kind, e.g., a so-called set-top box for use with cable television services.

It will further be recognized in hindsight by those of ordinary skill that natural circulation, rather than fans, may be used to circulate air between cavities in component carrier 118.

What is claimed is:

1. An electronic-component carrier assembly for an electronic device having a fan assembly and a plurality of electronic components, the carrier assembly comprising:
   (a) a first carrier and a second carrier each having:
      (1) a fan cavity arranged to accommodate the fan assembly, and
      (2) a plurality of component cavities arranged to accommodate the electronic components;
   (b) wherein the first carrier and second carrier, when assembled, define an airway connecting at least one of the component cavities to the fan cavity; and
   (c) wherein at least one of the first carrier and the second carrier includes a section that can be removed to form a cavity to accommodate at least one electrical component.

2. The assembly of claim 1, wherein the electronic component is at least one of a motherboard subassembly and a hard disk drive.

3. The assembly of claim 1, wherein at least one of the first carrier and the second carrier are formed from an EMI-shielding material.

4. The carrier assembly of claim 1, wherein at least one of the first carrier and the second carrier comprises a plurality of pieces.

5. The carrier assembly for claim 1, wherein at least one of the first carrier and the second carrier is formed from a recycled material.

6. The carrier assembly of claim 1, wherein at least one of the first carrier and the second carrier is formed by a molding process.

7. The carrier assembly of claim 1, wherein at least one of the first carrier and the second carrier is formed by a molding process.

8. An electronic-component carrier assembly comprising:
(a) a first carrier; and
(b) a second carrier fittable with the first carrier;
(c) wherein the first carrier and the second carrier define a plurality of cavities connected by an airway, at least one of the cavities accommodating at least one of a fan assembly and an electronic component, the electronic component comprising at least one of a motherboard subassembly and a hard disk drive;
(d) wherein at least one of the first carrier and the second carrier comprises a plurality of pieces; and
(e) wherein at least one of the first carrier and the second carrier is formed by molding a recycled EMI-shielding material and at least one of the first carrier and the second carrier includes a section that can be removed to form a cavity accommodating at least one an electronic component.

* * * * *